United States Patent [19]

Wilson et al.

[11] Patent Number: 5,058,433
[45] Date of Patent: Oct. 22, 1991

[54] WORKPIECE INSPECTION

[75] Inventors: David Wilson, Stonehouse; Peter G. Lloyd, Coalpit Heath, both of United Kingdom

[73] Assignee: Renishaw, plc, United Kingdom

[21] Appl. No.: 382,627

[22] PCT Filed: Dec. 19, 1988

[86] PCT No.: PCT/GB88/01133
§ 371 Date: Aug. 7, 1989
§ 102(e) Date: Aug. 7, 1989

[87] PCT Pub. No.: WO89/05959
PCT Pub. Date: Jun. 29, 1989

[30] Foreign Application Priority Data
Dec. 18, 1987 [GB] United Kingdom ............ 8729632

[51] Int. Cl.⁵ ............................ G01B 15/04
[52] U.S. Cl. ........................ 73/651; 73/661; 73/662; 33/556; 33/561; 33/573; 33/503; 318/572
[58] Field of Search ............ 33/573, 559, 561, 556, 33/558.04, 503; 73/651, 661, 662, 663; 318/572

[56] References Cited

U.S. PATENT DOCUMENTS

| | | | |
|---|---|---|---|
| 3,379,972 | 4/1968 | Foster et al. | 73/661 |
| 4,246,795 | 1/1981 | Sigg et al. | 73/651 |
| 4,294,121 | 10/1981 | Inoue | 73/662 |
| 4,428,055 | 1/1984 | Kelly et al. | 318/572 |
| 4,537,076 | 8/1985 | Lax et al. | 73/662 |
| 4,548,081 | 10/1985 | Wolthausen | 73/584 |
| 4,554,495 | 11/1985 | Davis | 318/572 |
| 4,562,392 | 12/1985 | Davis et al. | 318/572 |
| 4,594,791 | 6/1986 | Brandstetter | 33/503 |
| 4,644,783 | 2/1987 | Roberts et al. | 73/116 |
| 4,780,963 | 11/1988 | McCurtry | 33/503 |
| 4,918,988 | 4/1990 | Ebihara et al. | 73/594 |

FOREIGN PATENT DOCUMENTS

| | | |
|---|---|---|
| 024710A | 4/1987 | European Pat. Off. |
| 8603829 | 11/1986 | Int'l Pat. Institute . |
| 8801726 | 11/1988 | Int'l Pat. Institute . |
| 1161816 | 10/1985 | U.S.S.R. . |
| 2006435A | 9/1979 | United Kingdom . |
| 2070249A | 10/1981 | United Kingdom . |

OTHER PUBLICATIONS

Quantelec leaflets, (1) High-Power Transducer Bolt Clamped Langevin Type and (2) High-Power Transducers Bolt Clamped Langevin Type.

Primary Examiner—Hezron E. Williams
Assistant Examiner—Rose M. Finley
Attorney, Agent, or Firm—Oliff & Berridge

[57] ABSTRACT

Disclosed is a three dimensional coordinate measuring machine which is used to measure a workpiece. The machine has a probe containing a piezoelectric crystal which is capable of detecting the shockwave generated when the probe stylus contacts the surface of the workpiece, in order to provide a trigger signal. In order to reduce the risk of the piezoelectric crystal not triggering satisfactorily upon receipt of this shockwave, the workpiece is vibrated so that immediately upon contact the vibrations travel up the probe stylus to trigger the piezoelectric crystal. The vibrations are introduced by a vibration transducer which is bolted to the bed of the coordinate measuring machine.

20 Claims, 2 Drawing Sheets

WORKPIECE INSPECTION

FIELD OF THE INVENTION

This invention relates to the inspection of workpieces on position-determining apparatus such as a coordinate measuring machine, inspection robot or machine tool.

DESCRIPTION OF PRIOR ART

It is well known to mount a touch trigger probe on such a machine to allow workpiece inspection. The probe is moved in three dimensions by the machine to touch various pre-determined points on the workpiece surface. When a surface is touched by a stylus of the probe, it generates a trigger signal which is taken back to a control of the machine and used to "freeze" the outputs of measuring devices such as scales and readheads which show the position in space of the probe at the time of contact. The control can then read the coordinate values of the position.

A known type of such probe, such as shown in U.S. Pat. No. 4,702,013, contains a sensor which is sensitive to acoustic vibrations. The sensor may for example detect the acoustic shock wave which is generated when the stylus of the probe hits a workpiece surface, and generate a trigger signal as a result. One possible disadvantage of this type of arrangement is that the acoustic shock wave may occasionally be insufficient to generate the trigger signal, for example if the probe is moving very slowly when it contacts the workpiece surface, or if dirt or grease on the workpiece surface at the point of contact reduces the amplitude of the wave. One result of this disadvantage is that there is a certain minimum recommended speed at which the probe stylus should contact the workpiece surface, so as to ensure triggering, and this makes it difficult to probe internal surfaces of the workpiece such as small bores where there is insufficient space to accelerate the probe to the desired minimum speed.

SUMMARY OF THE INVENTION

The present invention proposes that the surface to be probed should be vibrated. Upon contact between the probe stylus and the surface, these vibrations are transmitted to the stylus so that they can be detected by the probe sensor.

Stated more particularly, one aspect of the invention provides position-determining apparatus comprising:
a probe;
a support for a workpiece;
means for providing relative movement between the probe and the workpiece support;
vibration-sensitive means associated with the probe for determining contact between the probe and a workpiece; and,
means for vibrating the workpiece; whereby upon contact between the probe and the workpiece, vibrations are transmitted from the workpiece to the probe for detection by the vibration-sensitive means.

A preferred method of vibrating the surface to be probed is by vibrating the bed or table on which the workpiece is mounted with a suitable vibration transducer. Means may be provided to decouple the probe so that it does not receive such vibrations through the structure of the machine in which it is mounted. More than one frequency of vibration may be provided. The frequency and/or amplitude of vibration may be varied.

BRIEF DESCRIPTION OF THE DRAWINGS

Preferred embodiments of the invention will now be described with reference to the accompanying drawings, wherein.

DESCRIPTION OF PREFERRED EMBODIMENTS

Figure 1:
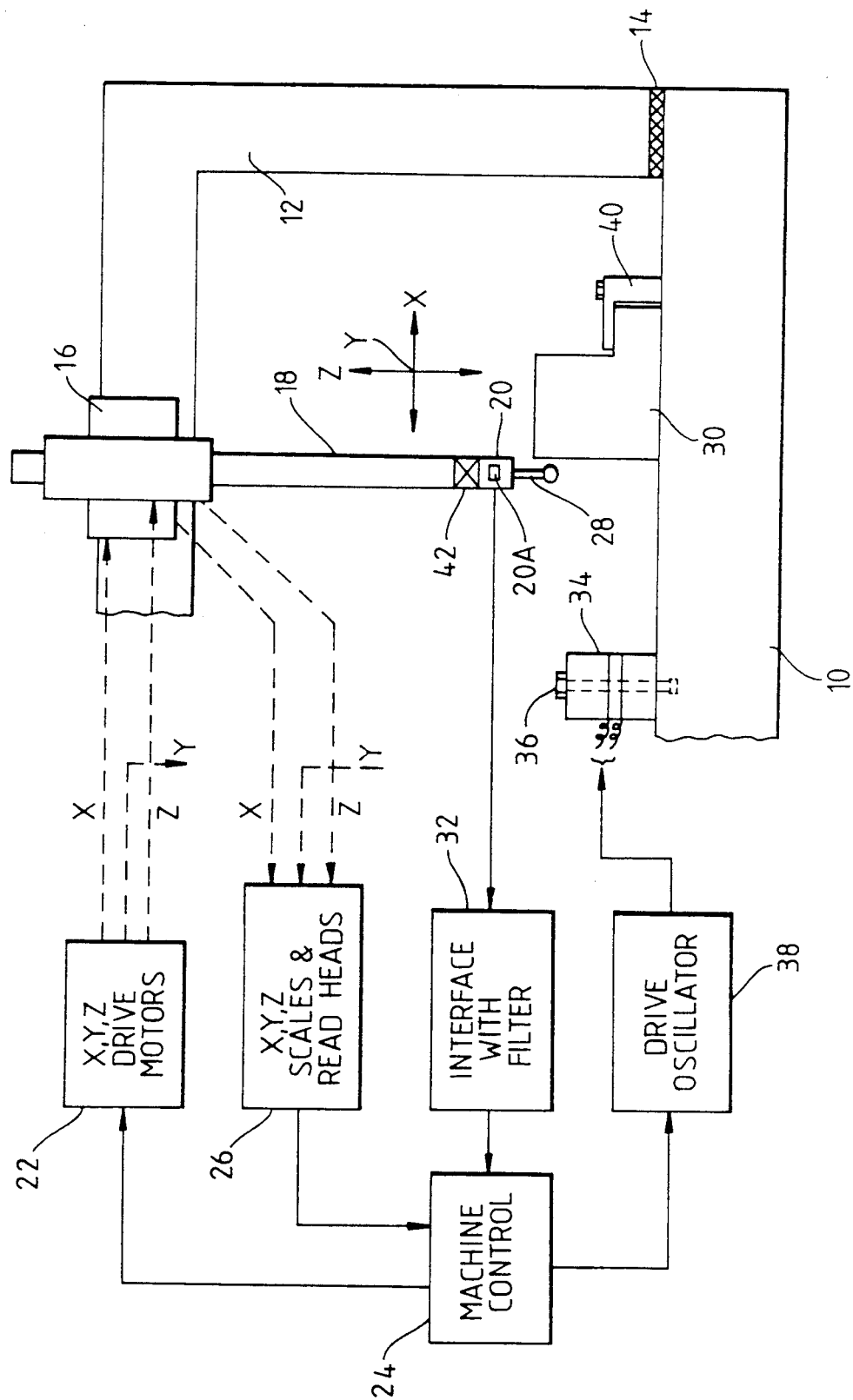
FIG. 1 is a schematic diagram of a coordinate measuring machine (CMM)

The CMM shown in FIG. 1 comprises a bed or table 10, for example of granite, and a bridge or gantry 12. The bridge or gantry 12 is movable in the direction of a Y axis on air bearings 14. A carriage 16 is movable in the direction of an X axis on the bridge or gantry 12 on further air bearings (not shown). The carriage 16 carries a quill 18 which is movable in the direction of a Z axis, also on further air bearings (not shown). At its lower end, the quill 18 carries a touch trigger probe 20.

The movements of the carriage 16, bridge or gantry 12 and quill 18 in the X, Y and Z directions respectively are effected by drive motors 22 under the control of a computer numerical control 24 of the CMM. Means for measuring these respective movements in the directions X, Y and Z are provided, in the form of a scale and readhead 26 for each direction. These provide feedback position information to the control 24.

The probe 20 can thus be moved in three dimensions, so as to bring its stylus 28 into contact with various points on the surface of a workpiece 30 to be measured, which is placed on the bed or table 10.

The machine as described so far is generally conventional.

The probe is as described in U.S. Pat. No. 4,702,013, which is incorporated herein by reference. As described in that application, the probe 20 contains a piezoelectric crystal, shown schematically at 20A. This crystal is sensitive to the shock wave generated when the stylus 28 hits a surface of the workpiece 30 (or indeed any other surface, such as a datum or reference surface which is fixed with respect to the bed or table 10). The output of the piezoelectric crystal is taken to an interface 32, which transmits a trigger signal to the control 24 when the shock wave is detected. The interface 32 contains a band pass filter, in order to render the probe sensitive to frequencies characteristic of the shock wave, while at the same time eliminating vibrations of the structural components of the CMM, so as to avoid false triggering. This filter may instead be provided inside the probe 20 itself. When the control 24 receives the trigger signal from the interface 32, it freezes or latches the outputs of counters which show the relative positions of the scales and readheads 26, and then takes readings of those outputs so as to determine the X, Y, and Z coordinates of the probe at the time of contact, in a generally conventional manner.

To overcome the possibility of failure of the probe to provide a trigger signal if the stylus 28 hits the workpiece 30 at a very slow speed or if the impact is cushioned by dirt or grease on the workpiece surface, an ultrasonic vibration transducer 34 is clamped to the bed or table 10 by a bolt 36. A suitable transducer is a high-power Langevin type piezoelectric vibrator available from Quantelec Limited, 46 Market Square, Witney, Oxfordshire OX8 6AL, United Kingdom. This transducer is driven at a suitable ultrasonic frequency, say 20 kHz, by a drive oscillator 38, under the control of the control 24. The transducer 34 may advantageously be mechanically tuned to the frequency of the vibration, with a high Q factor. It may output a relatively high acoustical power to the bed or table 10, say 5 watts. This causes the entire bed or table 10 to vibrate, and everything connected to it also vibrates, including the workpiece 30. The amplitude of the vibration is relatively small, say 10 nm, and so does not have any significant effect on the instantaneous position of the surfaces of the workpiece being measured. To improve the mechanical coupling of the vibrations to the workpiece 30 it may be clamped in a vice, or by means of the clamp 40 shown in the figure. Alternatively, the workpiece may, for convenience, be simply placed on the bed 10 without clamping.

In use, when a measurement is to be taken, the control 24 switches on the oscillator 38 causing vibration of the bed 10 and workpiece 30. At the instant the stylus 28 of the probe 20 contacts the surface of the workpiece, the ultrasonic vibrations are transmitted up the stylus and detected by the piezoelectric crystal which it contains. This causes the interface 32 to produce the trigger signal to the control 24.

The bandpass filter in the interface 32 is chosen so as to pass the frequency of the ultrasonic vibrations set by the oscillator 38. Desirably it is tuned to a fairly narrow band around that frequency (say 20 kHz).

The air bearings 14 (and the corresponding bearings not shown, for the other axes of movement) have the important function of decoupling the probe 20 from the bed or table 10. This means that the ultrasonic vibrations from the transducer 34 do not reach the probe through the structure of the machine, but only through the stylus 28 when the stylus touches the workpiece. As an alternative, if the CMM is not fitted with air bearings, the probe 20 may be mounted on the quill 18 via sound-insulating material 42.

The sound-insulating material 42 should be a rigid body, so that the position of the probe 20 relative to the quill 18 cannot be disturbed by distortion or deformation of the material 42. Suitable rigid ceramic foam materials are known and may be used for this purpose. In a modification with another form of decoupling, 42 indicates an anti-noise generator in the quill 18, in the place of the insulating material. This picks up sounds travelling down the quill, and generates a sound signal in anti-phase to cancel them out, so that no appreciable sound reaches the probe.

Figure 2:
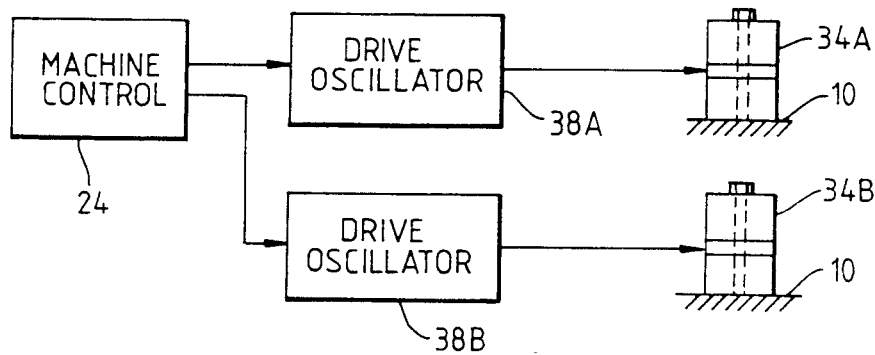
FIGS. 2, 3 and 4 are partial schematic diagrams of modifications to FIG. 1.

FIG. 2 shows a modification of the machine shown in FIG. 1. Instead of having a single vibration transducer 34, two such transducers 34A, 34B are clamped at different positions on the bed 10 of the machine. Each is driven by its own drive oscillator 38A, 38B at a different frequency. For example, the frequencies may be separated by about 1 or 2 kHz. One may be 20 kHz while the other is 21 kHz. This arrangement helps to overcome a possible problem which can sometimes affect the basic device as shown in FIG. 1. Namely, with just a single transducer at a single frequency, standing waves can be set up in the bed 10 and the workpiece 30, with the result that there may be nodes on the surface of the workpiece at which no significant vibration can be detected. If such a node happens to coincide with a point which is to be probed by the probe stylus 28, then the effectiveness of the FIG. 1 arrangement can be impaired. With two slightly different frequencies, excited from two different parts of the bed 10, however, it is very unlikely that any standing waves resulting from the vibration at one frequency will have nodes which are coincident with the position of nodes from standing waves at the other frequency.

The two drive oscillators 38A, 38B can both be switched on by the machine control 24 simultaneously.

Figure 3:
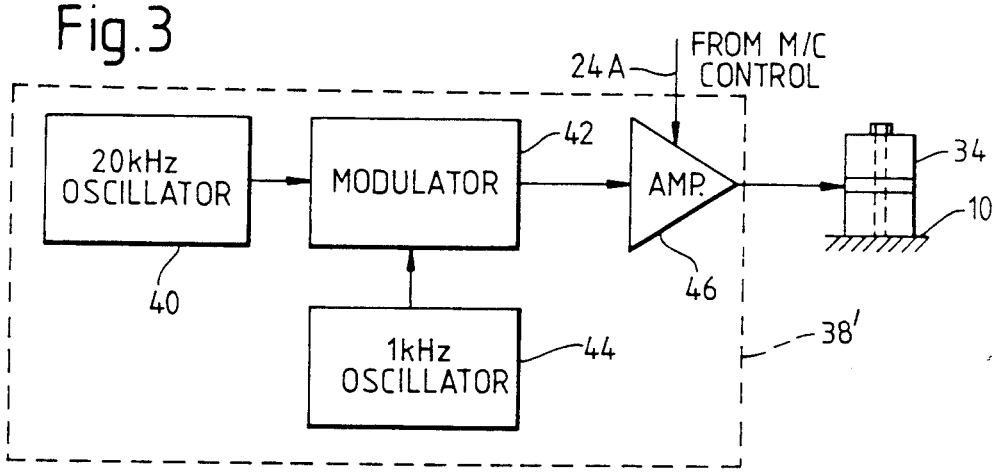

FIG. 3 shows how the same effect can be achieved with just one vibration transducer 34 clamped to the bed 10. The simple drive oscillator 38 is replaced by a drive oscillator 38', which has a comb frequency generator driving the transducer through a drive amplifier 46. The amplifier 46 is controlled as previously by the machine control 24, on a line 24A. The comb frequency generator comprises an oscillator 40 which generates a carrier signal, say 20 kHz. This is modulated in a modulator 42 by a 1 kHz signal from an oscillator 44. The result is to produce upper and lower side bands in addition to the 20 kHz carrier, so that the signal which is amplified and used to drive the transducer 34 has frequencies of 19 kHz, 20 kHz and 21 kHz.

If desired, a comb frequency generator can be used in place of a simple oscillator in each of the drive oscillators 38A, 38B in FIG. 2.

Other comb frequency generators, of generally conventional design, can be used in place of the simple comb frequency generator shown in FIG. 3. For example, the generator may generate up to five frequencies spaced by about 1 or 2 kHz. For use with a probe 20 of the type described in U.S. Pat. No. 4,702,013, we have found frequencies within the range 17 to 25 kHz to be most effective, though signals at the lower end of this range have the slight disadvantage of being audible, which can cause annoyance to users of the machine. Of course, the bandpass filter in the interface 32 is chosen so as to pass the range of frequencies which are to be used.

If desired, the comb frequency generator can be replaced by a white noise generator (the bandwidth of which is limited to exclude audible frequencies). The white noise can be generated from a pseudo-random binary sequence.

Alternatively, the transducer 34 can be replaced by a device which generates sound mechanically, e.g. by passing the air supply used for the air bearings 14 past an obstruction. The sound thus generated may be white noise, or it may be at one or several frequencies.

Figure 4:
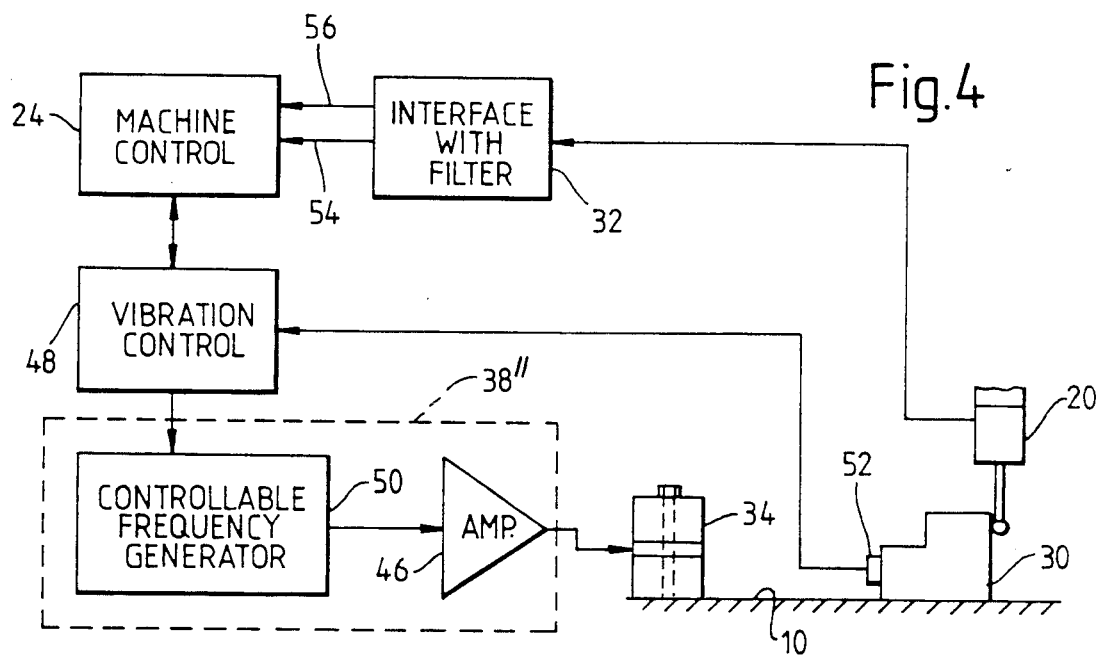

FIG. 4 shows another approach to solving the problem of nodes on the workpiece 30. The transducer 34 is driven by a drive oscillator 38" which has a frequency generator 50. This is controllable by a vibration control circuit 48. An accelerometer 52, which may comprise a piezoelectric crystal, is attached to a suitable surface of the workpiece 30 so as to detect the vibrations induced in the workpiece. These are fed to the vibration control circuit 48. When commanded by the machine control 24 to switch on the vibrations, the vibration control circuit 48 does so by switching on the generator 50 at a predetermined frequency and amplitude. The resulting vibrations in the workpiece 30, as detected by the accelerometer 52, are monitored by the circuit 48. Assuming they are of a satisfactory amplitude, the vibration control does nothing further, and merely signals to the machine control that measurement may proceed in the normal manner. If they are not satisfactory, however, the circuit 48 acts on the controllable generator 50 in order to improve matters. It may simply increase the amplitude of the vibrations until a satisfactory signal is received from the accelerometer 52. Desirably, however, it alters the frequency of the vibration. The vibration control may be pre-programmed with a sequence of discrete frequencies through which it steps. These frequencies may be at intervals of about 1 or 2 kHz within the same frequency range as discussed above. After selecting a frequency, the circuit 48 determines whether the output of the accelerometer 52 now has a satisfactory amplitude, indicating that satisfactory vibrations are being induced in the workpiece 40. If they are, the circuit 48 ceases to step through the different frequencies and signals to the machine control 24 that measurements can commence. If not, the circuit 48 selects the next frequency in the pre-programmed sequence. If the circuit 48 reaches the end of the sequence without achieving a satisfactory output from the accelerometer 52, it stops and gives an alarm signal. This indicates to the user of the machine that action is required to reposition the workpiece on the bed 10 so as to achieve better results.

The vibration control circuit 48 may comprise electronic logic circuits or it may contain a suitably programmed microprocessor.

Instead of having a separate accelerometer 52, it is possible to use the probe 20 for the purpose. The probe 20 contains internal circuitry as described in European Patent Specification No. 0 242 710 (which corresponds to U.S. Pat. No. 4,769,919). Correspondingly, the interface 32 contains circuitry as described in U.S. Pat. No. 4,916,339. Both these specifications are incorporated herein by reference. With this combination, the interface 32 has two output lines to the machine control 24. One of these lines, 54, is the conventional trigger output which indicates that the probe stylus has just contacted a workpiece surface. The other is a flag line 56, which indicates whether the trigger signal on line 54 was the result of a detection signal from the piezoelectric crystal 20A or from a fail-safe electrical switch circuit.

This arrangement is used as follows. Before a sequence of measurements is taken, the vibration control circuit 48 (under control of the machine control 24) causes the drive oscillator 38'' to vibrate the workpiece 40 at a predetermined first frequency. The machine control 24 then commences its normal measuring cycle, causing the probe 20 to probe desired points on the workpiece 30. As described in the above-noted European Patent specification and U.S. Patents, the probe 20 produces a signal at each of these contact points, and the interface 32 indicates this on the trigger line 54. The flag line 56 indicates whether the trigger signal was satisfactorily produced by the piezoelectric crystal in the probe, or whether the trigger signal was the result of the action of the fail-safe circuit. In the former case, of course, the machine control 24 continues its measurement cycle as normal, since the piezoelectric contact signal can be taken as indicating a reliable, accurate measurement (as shown by the frozen outputs of the read head 26). If the line 56 indicates otherwise, however, the control 24 is programmed to send a signal to the circuit 48. This in turn is programmed to alter the frequency and/or amplitude to the next step in a pre-programmed sequence as before. The programme in the control 24 now causes the measurement by the probe 20 to be repeated. On the repeat, the line 56 again indicates whether the trigger signal on line 54 was satisfactorily produced by the piezoelectric crystal, and if not the whole procedure can again be repeated until a satisfactory result is obtained.

A further method of using the probe 20 instead of using the accelerometer 52 is possible. Here, the probe is used (like the accelerometer 52) in order to select an appropriate vibration frequency and amplitude before the commencement of a measurement cycle, rather than to alter the vibration during a measurement cycle if satisfactory results are not achieved. Before the commencement of the measurement cycle, therefore, the probe 20 is driven by the machine control 24 into contact with the workpiece 30, as shown in FIG. 4. In this position the piezoelectric crystal within the probe 20 is capable of picking up vibration from the workpiece, in exactly the same way as the accelerometer 52 did. These can be used by the machine control 24 to determine whether to signal the circuit 48 to alter the frequency and/or amplitude before commencing the measurement cycle. However, with this arrangement the probe internal circuitry and the interface circuitry need to be modified from those shown in the above-noted European Patent specification and U.S. Patents. There needs to be a separate circuit which provides an output signal when the piezoelectric crystal detects vibrations exceeding a certain threshold. This separate circuit gives this output completely independently from the fail-safe electrical switch circuit, and should give its output continously while ever the vibrations detected exceed the threshold.

Although described in respect of a bridge or gantry-type CMM, the invention is equally applicable to other types of CMM. It can also be similarly used on machines such as inspection robots, and on machine tools (where the probe 20 is fitted in a tool-holding spindle which is movable in three dimensions, rather than in a quill 18).

It will be seen from the above description that the preferred embodiments of the invention have the advantages of improving the immunity to dirt and grease of the detection of contact of the stylus 28 with the workpiece 30. They also increase the noise immunity of the probe, because the filter can be made specific to the frequency or range of frequencies of the oscillator 38, and less amplification of the probe signal is required. A further important advantage is that the detection of the signal is less dependent on the speed of the contact of the stylus 28 with the workpiece 30, so that small bores and other internal configurations in the workpiece 30 can be probed successfully, where there is insufficient room for high speed of probe movement to be attained.

We claim:

1. Position-determining apparatus comprising:
    a probe;
    a support for a workpiece;
    means for providing relative movement between the probe and the workpiece support;
    means for determining a position of the probe relative to the workpiece support;
    vibration-sensitive means associated with the probe for determining contact between the prove and a workpiece on the workpiece support;
    means for vibrating the workpiece; whereby upon contact between the probe and the workpiece, vibrations are transmitted from the workpiece to the probe for detection by the vibration-sensitive means; and
    decoupling means in a path between the workpiece support and the vibration-sensitive means, for preventing transmission of vibrations from the vibrating means to the vibration-sensitive means along said path, said decoupling means comprising a sound-insulating material.

2. Apparatus according to claim 1, wherein the vibrating means vibrates the workpiece at an ultrasonic frequency.

3. Apparatus according to claim 1, wherein the vibrating means comprises a transducer secured to the workpiece support.

4. Position-determining apparatus comprising:
a probe;
a support for a workpiece;
means for providing relative movement between the probe and the workpiece support;
means for determining a position of the probe relative to the workpiece support;
vibration-sensitive means associated with the probe for determining contact between the probe and a workpiece on said workpiece support; and,
means for vibrating the workpiece; whereby upon contact between the probe and the workpiece, vibrations are transmitted from the workpiece to the probe for detection by the vibration-sensitive means;
wherein said vibrating means comprises a first vibration transducer for producing vibrations, and a second vibration transducer for cancelling nodes in any standing waves caused by the first transducer.

5. Apparatus according to claim 4, wherein the transducers are secured to the workpiece support at respective different positions.

6. Apparatus according to claim 4, wherein the transducers are driven at respective different frequencies.

7. Apparatus according to claim 4, wherein the vibrating means vibrates the workpiece at an ultrasonic frequency.

8. Apparatus according to claim 4, wherein the vibrating means comprises a transducer secured to the workpiece support.

9. Position-determining apparatus comprising:
a probe;
a support for a workpiece;
means for providing relative movement between the probe and the workpiece support;
means for determining a position of the probe relative to the workpiece support;
vibration-sensitive means associated with the probe for determining contact between the probe and a workpiece on the workpiece support;
means for vibrating the workpiece; whereby upon contact between the probe and the workpiece, vibrations are transmitted from the workpiece to the probe for detection by the vibration-sensitive means; and
means, separate from said vibrating means, for producing a control signal, said control signal acting on the vibrating means to vary at least one of a frequency and an amplitude of vibration of the vibrating means.

10. Apparatus according to claim 9, including means for determining whether the vibration of the workpiece exceeds a predetermined level, and for acting on the varying means to vary at least one of the frequency and the amplitude if not.

11. Apparatus according to claim 10, wherein the determining means includes a sensor located on the workpiece.

12. Apparatus according to claim 10, wherein the determining means acts on the output of the vibration-sensitive means.

13. Apparatus according to claim 9, wherein the vibrating means vibrates the workpiece at an ultrasonic frequency.

14. Apparatus according to claim 9, wherein the vibrating means comprises a transducer secured to the workpiece support.

15. Position-determining apparatus comprising:
a probe;
a support for a workpiece;
means for providing relative movement between the probe and the workpiece support;
means for determining a position of the probe relative to the workpiece support;
vibration-sensitive means associated with the probe for determining contact between the probe and a workpiece on the workpiece support; and,
means for vibrating the workpiece; whereby upon contact between the probe and the workpiece, vibrations are transmitted from the workpiece to the probe for detection by the vibration-sensitive means;
wherein the vibrating means vibrates the workpiece at a plurality of different frequencies simultaneously.

16. Apparatus according to claim 15, wherein the vibrating means vibrates the workpiece at an ultrasonic frequency.

17. Apparatus according to claim 15, wherein the vibrating means comprises a transducer secured to the workpiece support.

18. Position-determining apparatus comprising:
a probe;
a support for a workpiece;
means for providing relative movement between the probe and the workpiece support;
means for determining a position of the probe relative to the workpiece support;
vibration-sensitive means associated with the probe for determining contact between the probe and a workpiece on the workpiece support;
means for vibrating the workpiece; whereby upon contact between the probe and the workpiece, vibrations are transmitted from the workpiece to the probe for detection by the vibration-sensitive means; and
decoupling means in a path between the workpiece support and the vibration-sensitive means, for preventing transmission of vibrations from the vibrating means to the vibration-sensitive means along said path, said decoupling means comprising an anti-noise generator.

19. Apparatus according to claim 18, wherein the vibrating means vibrates the workpiece at an ultrasonic frequency.

20. Apparatus according to claim 18, wherein the vibrating means comprises a transducer secured to the workpiece support.

* * * * *